(12) United States Patent
Tang et al.

(10) Patent No.: US 11,134,657 B2
(45) Date of Patent: Oct. 5, 2021

(54) PET LEASH PREVENTING LOCKING DUE TO JERK

(71) Applicant: Best-Run Technology Ltd., Zhejiang (CN)

(72) Inventors: Wenwei Tang, Zhejiang (CN); Qingfeng Dai, Zhejiang (CN); Yingzhou Chen, Zhejiang (CN); Di Fang, Zhejiang (CN); Ying Tang, Zhejiang (CN)

(73) Assignee: Best-Run Technology Ltd., Zhejiang (CN)

( * ) Notice: Subject to any disclaimer, the term of this patent is extended or adjusted under 35 U.S.C. 154(b) by 422 days.

(21) Appl. No.: 16/209,904

(22) Filed: Dec. 4, 2018

(65) Prior Publication Data

US 2020/0045936 A1 Feb. 13, 2020

(30) Foreign Application Priority Data

Aug. 10, 2018 (CN) .......................... 201810910170.1

(51) Int. Cl.
*A01K 27/00* (2006.01)
*B65H 75/44* (2006.01)
*B65H 75/40* (2006.01)

(52) U.S. Cl.
CPC ....... *A01K 27/004* (2013.01); *B65H 75/4428* (2013.01); *B65H 75/406* (2013.01); *B65H 2701/35* (2013.01)

(58) Field of Classification Search
CPC . A01K 27/003; A01K 27/004; B65H 75/4428
USPC ......................................... 119/794, 796–798
See application file for complete search history.

(56) References Cited

U.S. PATENT DOCUMENTS 9,339,014 B1 * 5/2016 Wettermann ......... A01K 27/004
2011/0220036 A1 * 9/2011 Matthews .......... B65H 75/4431
119/796

FOREIGN PATENT DOCUMENTS

CN 205455295 8/2016
WO WO-2017158481 A1 * 9/2017 ......... B65H 75/4447

* cited by examiner

*Primary Examiner* — Peter M Poon
*Assistant Examiner* — Danielle A Clerkley
(74) *Attorney, Agent, or Firm* — JCIP Global Inc.

(57) ABSTRACT

A pet leash preventing locking due to jerk includes a housing provided with a handle and a reel disk arranged in the housing. The reel disk is rotatably connected to the housing. A leash rope is wound on the reel disk. One end of the leash rope penetrates through the housing. The housing is provided with a rotary damper. A clutch structure is provided between the reel disk and the rotary damper, and is actuable under a centrifugal force to connect the reel disk to the rotary damper when a rotation speed of the reel disk exceeds a predetermined rotation speed.

16 Claims, 6 Drawing Sheets

PET LEASH PREVENTING LOCKING DUE TO JERK

CROSS-REFERENCE TO RELATED APPLICATION

This application claims the priority benefit of China application serial no. 201810910170.1, filed on Aug. 10, 2018. The entirety of the above-mentioned patent application is hereby incorporated by reference herein and made a part of this specification.

BACKGROUND OF THE DISCLOSURE

Field of the Disclosure

The disclosure belongs to the technical field of pet leash products, in particular to a pet leash which prevents locking due to jerk.

Description of Related Art

Pets are human's friends. There are an increasing number of people keeping pets. Walking pets is an essential activity for keeping pets. For the safety of other people and pets, leashing is of great significance. When taking pet out for a walk, not only it is necessary to ensure that the pet has a relatively large area for exercising, but also it is important to make sure that pet owner can keep control of the pet's exercise area in time. For this purpose, a retractable leash having a locking function has been proposed, for example, Chinese utility patent application No. CN201620046154.9 discloses a pet leash preventing jerk, including a housing provided with a handle and a leash rope disposed in the housing. The housing is assembled by combining two symmetrical halve bodies. An outlet hole for the leash to extend out of the housing is formed between the two halve bodies, and a wire bead is arranged on the outlet hole. A locking mechanism that makes the leash to be automatically locked is disposed in the housing. The locking mechanism is connected to a wheel for placing the leash, the locking mechanism is further electrically connected to a single chip microcomputer disposed in the housing, and the housing is provided with a switch that opens or closes the locking mechanism.

The above solution basically solves the technical requirement of ensuring that the pet has a large area for exercising, and also makes sure that the pet owner can keep control of the exercise area in time. However, pet's sudden jerk is unpredictable, and it takes a certain time for the pet owner to react when the jerk occurs. When the leash rope is locked, the huge impact caused by pet's jerk inevitably makes the collar to hurt the pet's neck. In the state where the leash rope is not locked, the pet bursts at a fast speed, and it is difficult for the pet owner to control the pet's moving area.

SUMMARY OF THE DISCLOSURE

The purpose of the disclosure is to provide a pet leash which prevents locking due to jerk to solve the above problem.

In order to achieve the above object, the present disclosure adopts following technical solutions. The pet leash is adapted to prevent locking due to jerk. The pet leash includes a housing provided with a handle and a reel disk disposed in the housing. The reel disk and the housing are rotatably connected to each other. A leash rope is wound on the reel disk. One end of the leash rope penetrates through the housing. The housing is provided with a rotary damper. A clutch mechanism that can be actuated under a centrifugal force to connect the reel disk to the rotary damper when a rotation speed of the reel disk exceeds a predetermined rotation speed is provided between the reel disk and the rotary damper.

In the above-mentioned pet leash preventing locking due to jerk, the rotary damper includes a stationary member and a rotatable member. The stationary member is fixedly connected to the housing. The rotatable member is connected to and in damping contact with the stationary member. When the rotatable member is subjected to a force greater than a damping force between the rotatable member and the stationary member, the rotatable member is rotatable relative to the stationary member. When the rotation speed of the reel disk exceeds the predetermined rotation speed, the elastic clutch structure can be actuated under the centrifugal force and connected to the rotatable member.

In the above-mentioned pet leash preventing locking due to jerk, the stationary member has a disk shape, the rotatable member has an annular shape, and the rotatable member is wrapped around a periphery of the stationary member.

In the above-mentioned pet leash preventing locking due to jerk, a center of the stationary member is provided with a non-circular hole. The housing is provided with a non-circular column corresponding to the non-circular hole, and the non-circular column is inserted in the non-circular hole.

In the above-described pet leash preventing locking due to jerk, the rotatable member includes an annular ring. One end of the annular ring is provided with an end plate integrally connected thereto. A center of the end plate has a central hole for the non-circular column to pass therethrough. Another end of the annular ring is provided with an opening for entering of the stationary member, and a sealing plate is fixed at the opening.

In the above-mentioned pet leash preventing locking due to jerk, the clutch structure is an elastic clutch structure. When the centrifugal force of the reel disk relative to the clutch structure is greater than an elastic force, the clutch structure is actuated. When the centrifugal force of the reel disk relative to the clutch structure is less than the elastic force, the clutch structure is reset.

In the above-mentioned pet leash preventing locking due to jerk, the clutch structure includes a spinning member hinged to the reel disk. An elastic member is disposed between the spinning member and the reel disk. When the centrifugal force of the reel disk relative to the spinning member is greater than an elastic force of the elastic member, the spinning member rotates and one end thereof is connected to the rotatable member.

In the above-mentioned pet leash preventing locking due to jerk, the elastic member is a tension spring, wherein one end of the tension spring is connected to the reel disk, and the other end of the tension spring is connected to the spinning member. The rotatable member is provided with a stopper, and the spinning member abuts against the stopper after rotation of the rotating member.

In the above-mentioned pet leash preventing locking due to jerk, the clutch structure includes a blind hole provided on the reel disk. A pin body is disposed in the blind hole. An elastic sheet capable of retaining the pin body in the blind hole is provided between the pin body and the reel disk. One end of the elastic sheet is connected with the reel disk, and the other end of the elastic sheet is connected to the pin body. When the centrifugal force of the reel disk relative to the pin body is greater than an elastic force of the elastic sheet, one end of the pin body extends out of the blind hole and is connected to the rotatable member.

In the above-mentioned pet leash preventing locking due to jerk, the rotatable member is provided with a stopper. A protruding end of the pin body abuts against the stopper after one end of the pin body protrudes out of the blind hole.

As compared with the related art, the advantages of the disclosure are:

1. When the pet jerks, the leash rope drives the reel disk to rotate with acceleration. An ejecting mechanism activates and drives the rotary damper to apply resistance to the pet without locking, thereby weakening the impact of the collar caused by the jerk to the pet and reducing the harm of the collar caused to the pet.

2. The spinning body is automatically connected to the rotary damper depending on the centrifugal force when a user does not react, thereby providing resistance to the reel disk and further improving the safety factor of use.

3. When the pet is moving at low speed, the reel disk is separated from the rotary damper, and the reel disk can rotate freely. A length of the leash rope is retractable to expand the exercise range of the pet, so that the pet can move freely under the traction of leash rope during exercise.

4. The spinning body is retracted or extended by the tension of the elastic member and the centrifugal force, and is separated from/coupled to the rotary damper, and a structure thereof is simple and movement thereof is stable.

In order to make the aforementioned features and advantages of the disclosure more comprehensible, embodiments accompanying figures are described in detail below.

DESCRIPTION OF EMBODIMENTS

The technical solutions in the embodiments of the present disclosure will be clearly and thoroughly described with reference to the accompanying drawings in the embodiments of the present disclosure. It is obvious that the described embodiments are only a part of the embodiments of the present disclosure, and not all of the embodiments. All other embodiments obtained by those skilled in the art based on the embodiments of the present disclosure without inventive efforts are within the scope of the present disclosure.

First Embodiment

Figure 1:
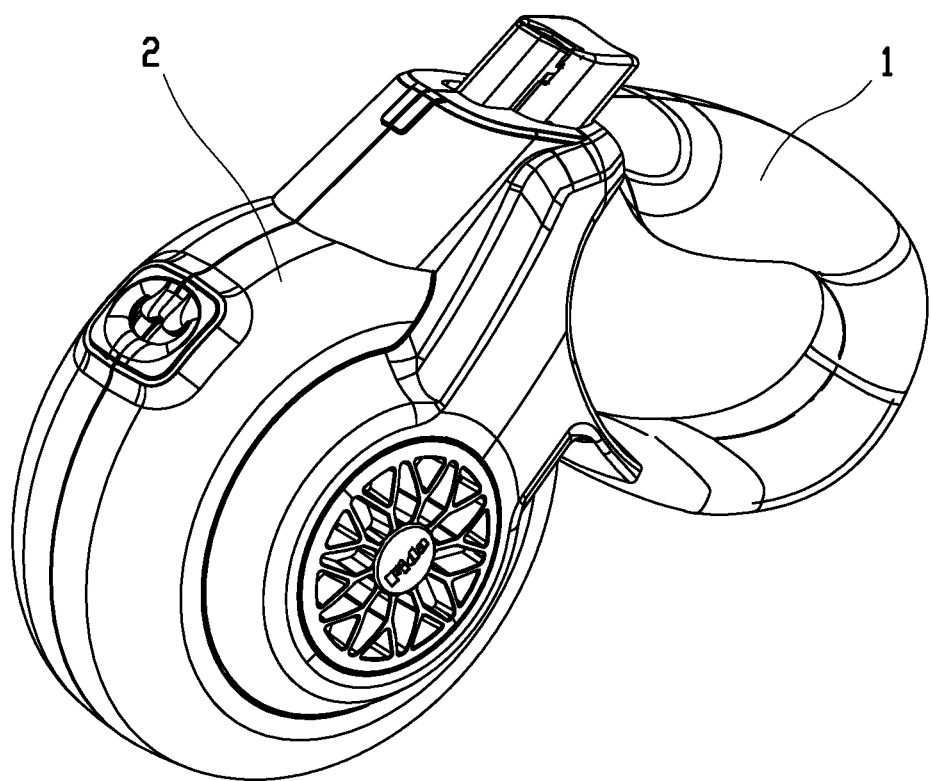
FIG. 1 is a structural schematic view of the present disclosure.
Figure 2:
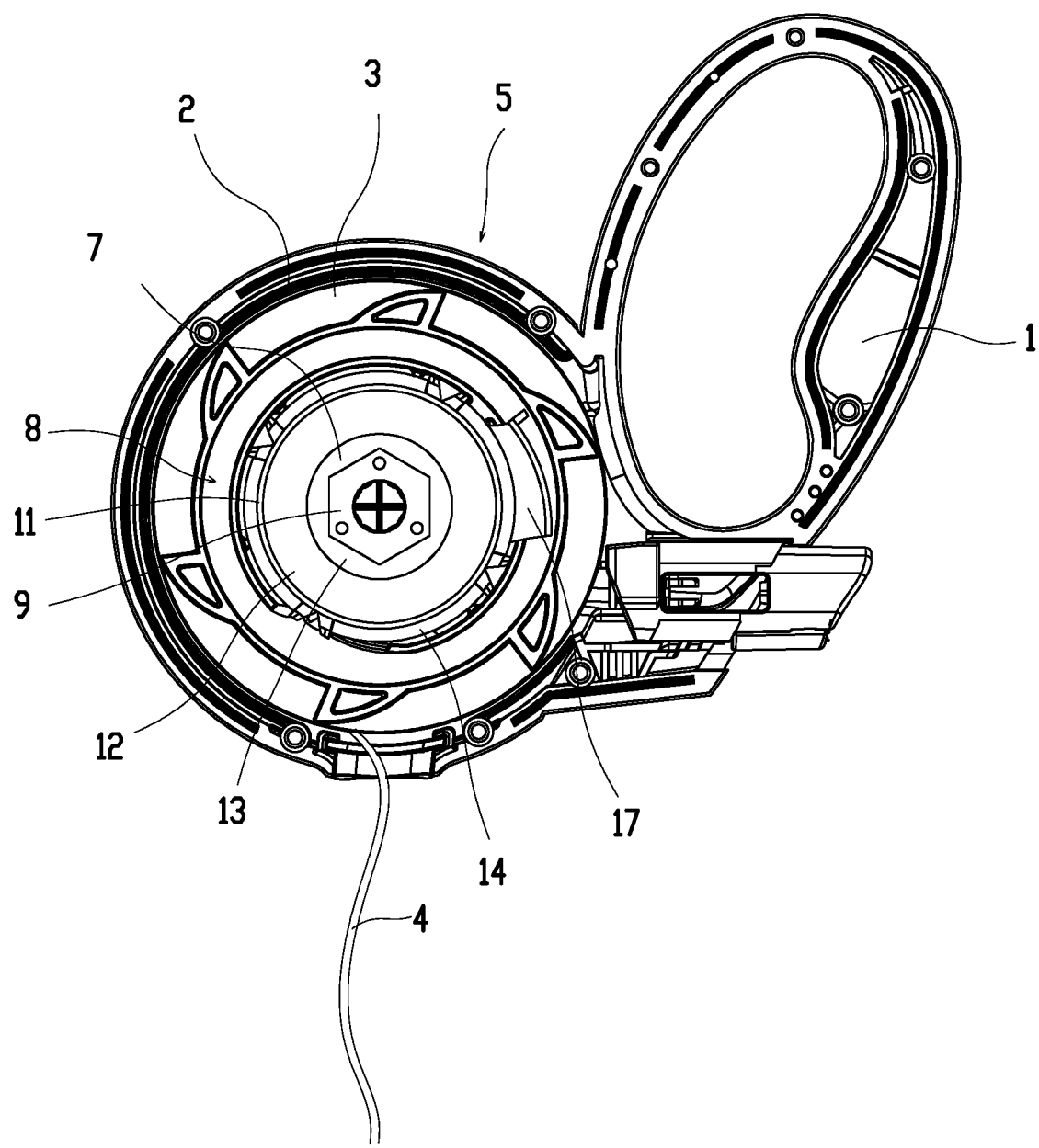
FIG. 2 is a structural schematic view of a rotary damper provided by the present disclosure.
Figure 3:
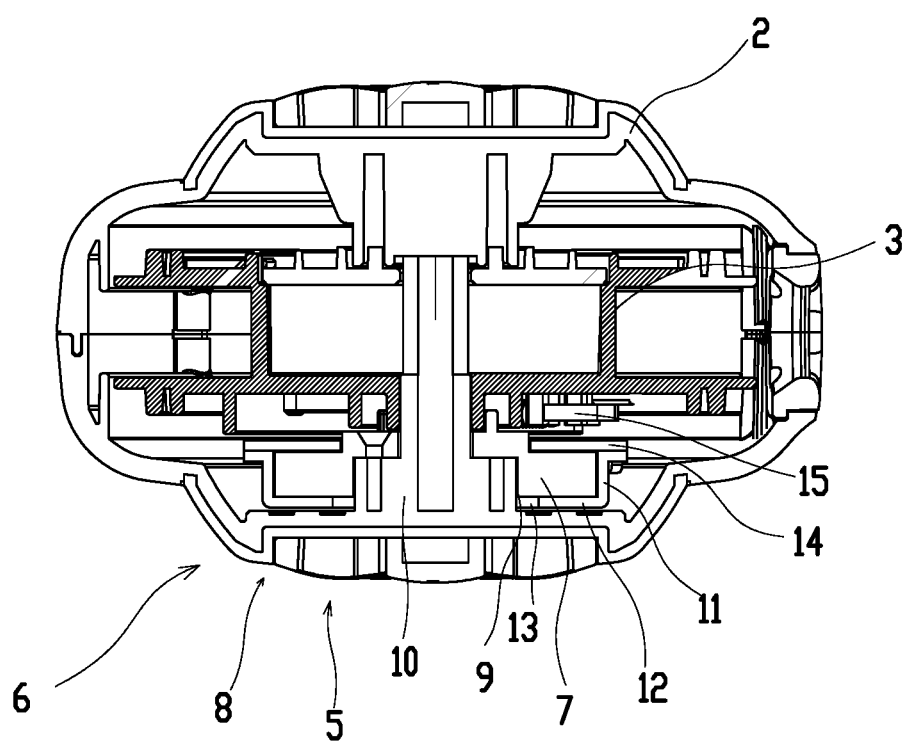
FIG. 3 is a cross-sectional view of the present disclosure.
Figure 4:
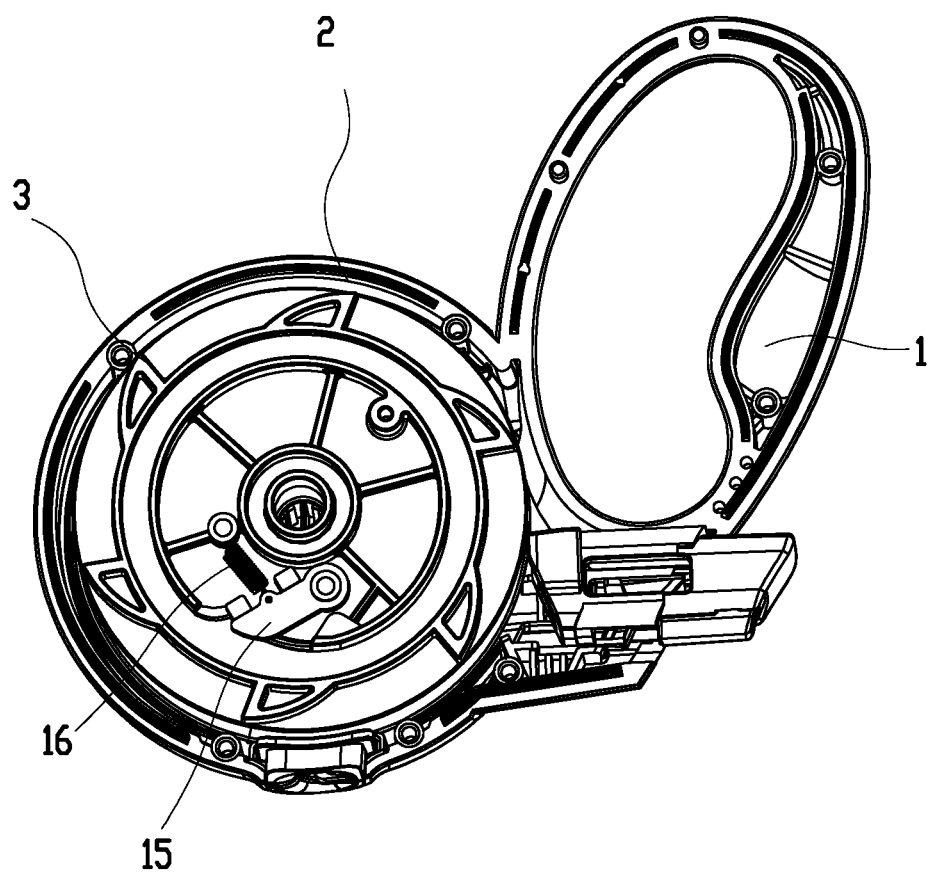
FIG. 4 is a schematic view of a clutch structure in a first embodiment of the present disclosure.
Figure 5:
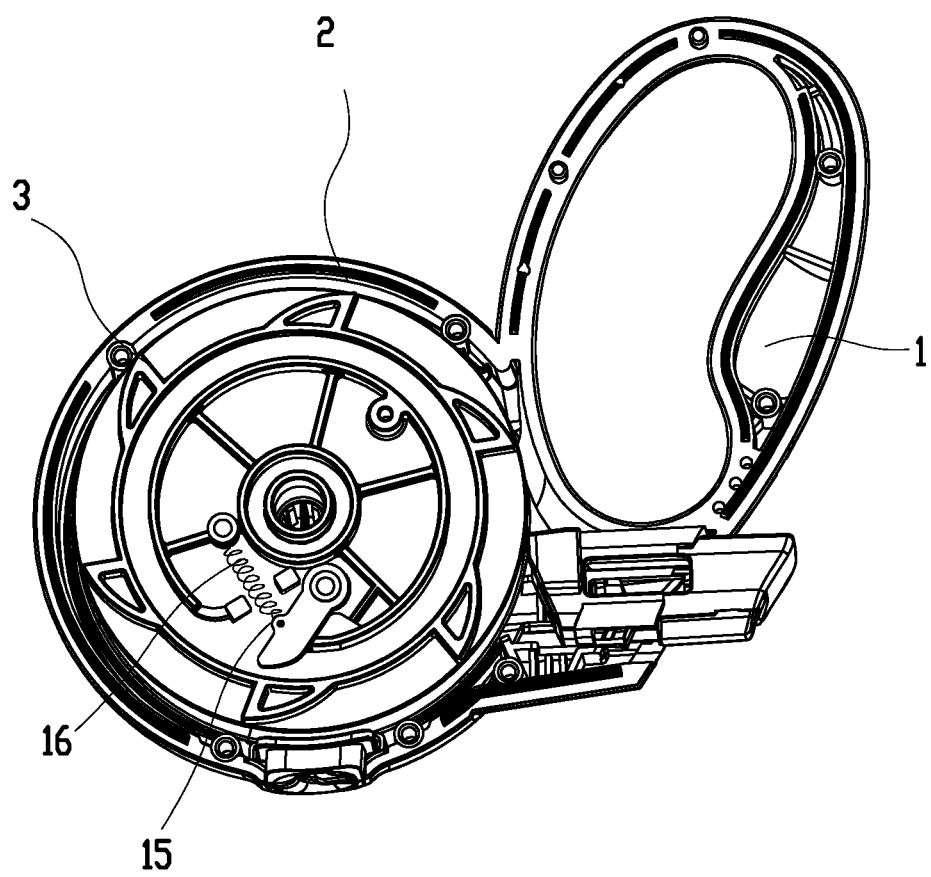
FIG. 5 is a schematic view of a spinning member extended out in the first embodiment of the present disclosure.
Figure 6:
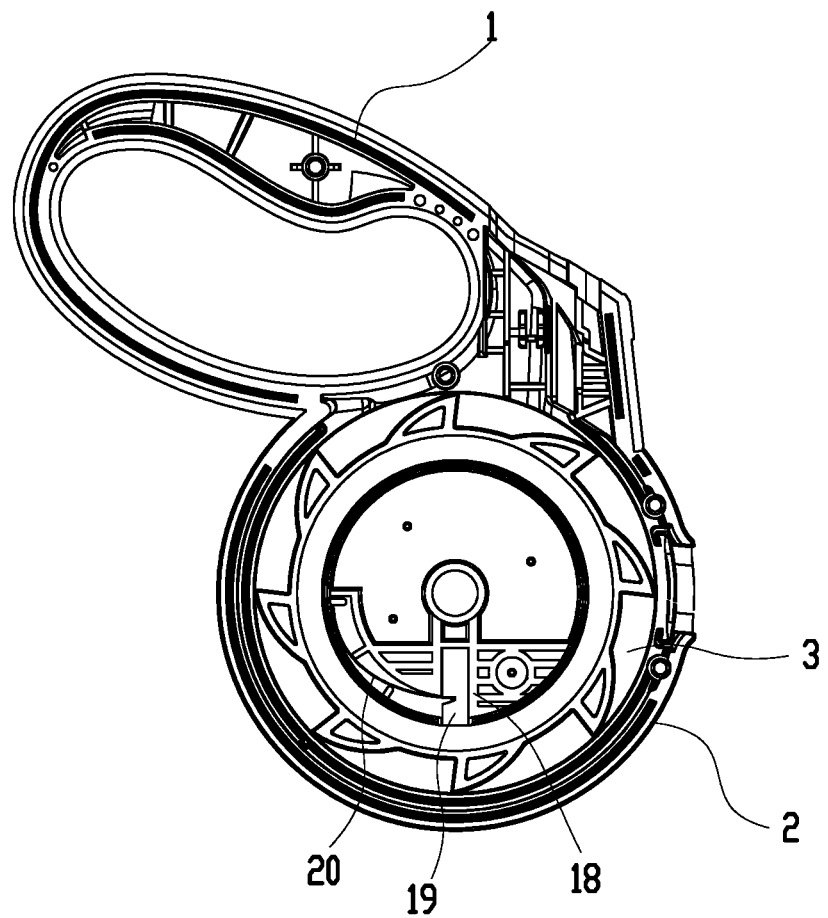
FIG. 6 is a schematic view of a clutch mechanism in a second embodiment of the present disclosure.

As shown in FIG. 1 to FIG. 2, a pet leash preventing locking due to jerk includes a housing 2 provided with a handle 1 and a reel disk 3 disposed in the housing 2. The reel disk 3 and the housing 2 are rotatably connected to each other. A leash rope 4 is wound on the reel disk 3. One end of the leash rope 4 penetrates through the housing 2, and the housing 2 is provided with a rotary damper 5. A clutch structure 6 that can be actuated under a centrifugal force to connect the reel disk 3 to the rotary damper 5 when a rotation speed of the reel disk 3 exceeds a predetermined rotation speed is provided between the reel disk 3 and the rotary damper 5.

When a pet suddenly jerks, the pet pulls the leash rope 4 fast, and the leash rope 4 drives the reel disk 3 to rotate with acceleration. The clutch structure 6 on the reel disk 3 is ejected from the reel disk 3 due to effect of the centrifugal force, such that the reel disk 3 is connected to the rotary damper 5. The rotary damper 5 provides resistance to reduce the rotation speed of the reel disk 3, so that the resistance generated by the rotary damper 5 is applied to the pet by the leash rope 4 to limit bursting jerk speed of the pet. Meanwhile, the leash rope 4 is prevented from being locked to avoid that the large pulling force causes harm to the pet's neck.

Specifically, the rotary damper 5 includes a stationary member 7 and a rotatable member 8. The stationary member 7 is fixedly connected to the housing 2. The rotatable member 8 is connected to and in damping contact with the stationary member 7. When the rotation speed of the reel disk 3 exceeds the predetermined rotation speed, the clutch structure 6 can be actuated under the centrifugal force and connected to the rotatable member 8. When a force of the reel disk 3 applied to the rotatable member 8 through an effect of the clutch structure 6 is greater than a damping force between the rotatable member 8 and the stationary member 7, the rotatable member 8 is rotatable relative to the stationary member 7 to generate a damping force opposite to a rotation direction of the reel disk 3. When the pet's jerk force is relatively small and does not cause harm to the pet, that is, when the force of the reel disk 3 is smaller than the damping force between the rotatable member 8 and the stationary member 7, the damping force offsets the pet's jerk force, thereby preventing jerk of the pet. When the pet's jerk force is large, it may cause harm to the pet, the damping force between the rotatable member 8 and the stationary member 7 offsets some of the pet's jerk force so as to reduce the pet's jerk speed and give a pet owner a certain reaction time.

Preferably, the stationary member 7 has a disk shape, and the rotatable member 8 has an annular shape. The rotatable member 8 is wrapped around a periphery of the stationary member 7. A friction filler, e.g., coarse leather or the like or a viscous filler such as viscous oil, is filled between an inner cavity of the rotatable member 8 and the stationary member 7, so that the rotatable member 8 is connected to and in damping contact with the stationary member 7. A center of the stationary member 7 is provided with a non-circular hole 9. A non-circular column 10 corresponding to the non-circular hole 9 is disposed in the housing 2. The non-circular column 10 is inserted into the non-circular hole 9, thereby fixing the stationary member 7 to the housing 2. The rotatable member 8 includes an annular ring 11 having an end plate 12 integrally connected thereto at one end of the annular ring 11. A center of the end plate 12 has a central hole 13 for the non-circular column 10 to passes therethrough. The non-circular column 10 passes through the central hole 13 and is positioned and connected to the non-circular hole 9 to prevent the stationary member 7 from rotating under an effect of the damping force. An opening for the stationary member 7 to enter is provided at the other end of the annular ring 11. A sealing plate 14 is fixed at the opening. The sealing plate 14 secures the stationary member 7 in the inner cavity of the rotatable member 8 to achieve axial positioning of the rotatable member 8. Preferably, the sealing plate 14 is connected to the annular ring 11 by a fastening structure such as a screw or a buckle and the like. A bottom portion of the non-circular hole 9 is provided with a positioning plate, and is fixedly connected to the non-circular column 10 through a fastening structure such as screws, buckles and the like provided on the positioning plate.

Preferably, the clutch structure 6 is an elastic clutch structure. When the centrifugal force of the reel disk 3 relative to the clutch structure 6 is greater than the elastic force, the clutch structure 6 is actuated to connect with the rotatable member 8. When the centrifugal force of the reel disk 3 relative to the clutch structure 6 is less than the elastic force, the clutch structure 6 is reset and separated from the rotatable member 8 to allow free rotation of the reel disk 3.

Specifically, the clutch structure 6 includes a spinning member 15. The spinning member 15 has a strip shape, and one end thereof is hinged with the reel disk 3. An elastic member 16 is disposed between the spinning member 15 and the reel disk 3. Under a pulling force of the elastic member 16, one end of the spinning member 15 away from the hinging position is close to the center of the reel disk 3. When the centrifugal force of the reel disk 3 relative to the spinning member 15 is greater than an elastic force of the elastic member 16, the spinning member 15 rotates and one end thereof is connected to the rotatable member 8. Preferably, the reel disk 3 is provided with a first stopper. The first stopper is disposed on a side of the spinning member 15 adjacent to the elastic member 16. When the centrifugal force is less than the pulling force of the elastic member 16, the spinning member 15 abuts against the first stopper, so it can be prevented that the spinning member 15 swings and is connected to the rotatable member 8 during the rotation of the reel disk 3 and hinders the reel disk 3 from rotating normally. When the centrifugal force of the reel disk 3 relative to the spinning member 15 is greater than the elastic force of the elastic member 16, the spinning member 15 overcomes the pulling force of the elastic member 16, swings outwardly by centering on the hinging portion, and protrudes from the reel disk 3 to connect to the rotatable member 8. Preferably, a side of the rotating member 15 away from the first stopper is provided with a second stopper. When the rotating member 15 is actuated, it abuts against the second stopper. When the rotating member 15 is connected to the rotatable member 8, the second stopper effectively supports the spinning member 15 and transmits power of the reel disk 3 to the rotatable member 8.

Further, the elastic member 16 is a tension spring. One end of the tension spring is connected to the reel disk 3, and the other end of the tension spring is connected to the spinning member 15. The rotatable member 8 is provided with a stopper 17. The spinning member 15 abuts against the stopper 17 after rotation of the rotating member 15, such that the reel disk 3 is connected to the rotary damper 5 through the clutch structure 6, thereby generating resistance to the reel disk 3.

Second Embodiment

The basic principle of the second embodiment is basically the same as that of the first embodiment, except that the clutch structure 6 includes a blind hole 18 disposed on the reel disk 3, and a pin body 19 is disposed in the blind hole 18. An elastic sheet 20 for retaining the pin body 19 in the blind hole 18 is provided between the pin body 19 and the reel disk 3. One end of the elastic sheet 20 is connected to the reel disk 3, and the other end thereof is connected to the pin body 19. When the centrifugal force of the reel disk 3 relative to the pin body 19 is greater than an elastic force of the elastic sheet 20, one end of the pin body 19 extends out of the blind hole 18 and is connected to the rotatable member 8. The rotatable member 8 is provided with a stopper 17. A protruding end of the pin body 19 abuts against the stopper 17 after one end of the pin body 19 extends out of the blind hole 18. The rotation power of the reel disk 3 is transmitted to the rotatable member 8 to drive relative rotation to occur between the rotatable member 8 and the stationary member 7, generating a resistance to prevent the reel disk 3 from rotating.

Preferably, the stopper 17 in the second embodiment has a slot shape. When the reel disk 3 rotates at a high speed, and when the pin body 19 rotates to the position of the stopper 17 and enters the stopper 17 after losing support, the pin body 19 is connected to the rotatable member 8 and drives rotation of the rotatable member 8. The rotary damper 5 forms a resistance, increasing the difficulty in rotation of the reel disk 3 and reducing the rotation speed of the reel disk 3 while reducing an outlet speed of the leash rope 4, thereby decreasing the jerk speed of the pet and controlling the moving range of the pet, and providing the pet owner sufficient reaction time. In the meantime, the leash rope 4 is prevented from being locked, so it can be avoided that the leash rope 4 applies a large pulling force on the pet and causes injury to the pet's neck at the moment that the pet jerks. Preferably, a plurality of stoppers 17 are uniformly disposed on the rotatable member 8. The pin body 19 can be ejected into the stopper 17 by rotating at a small angle to shorten the time during which the pin body 19 is ejected into the stopper 17.

The specific embodiments described herein are merely illustrative of the spirit of the disclosure. A person skilled in the art can make various modifications or additions to the specific embodiments described above or replace them in a similar manner without departing from the spirit of the disclosure or exceeding beyond the scope defined by appended claims.

Although the disclosure uses the following terminologies more often, namely the handle 1, the housing 2, the reel disk 3, the leash rope 4, the rotary damper 5, the clutch structure 6, the stationary member 7, the rotatable member 8, the non-circular hole 9, the non-circular column 10, the end plate 12, the central hole 13, the sealing plate 14, the spinning member 15, the elastic member 16, the stopper 17, the blind hole 18, the pin body 19, the elastic sheet 20, etc., the disclosure does not exclude the possibility of using other terms. These terms are used only for more easily describing and explaining the nature of the present disclosure; any interpretation of them as additional limitations is inconsistent with the spirit of the present disclosure.

What is claimed is:

1. A pet leash preventing locking due to jerk, the pet leash comprising a housing provided with a handle and a reel disk disposed in the housing, the reel disk rotatably connected to the housing, a leash rope wound on the reel disk, one end of the leash rope penetrates through the housing, wherein the housing is provided with a rotary damper, and a clutch structure is provided between the reel disk and the rotary damper, and is actuable under a centrifugal force to connect the reel disk to the rotary damper when a rotation speed of the reel disk exceeds a predetermined rotation speed, wherein the rotary damper comprises a stationary member and a rotatable member, the stationary member has a disk shape, the rotatable member has an annular shape and wrapped around a periphery of the stationary member, the stationary member is fixedly connected to the housing, the rotatable member is connected to and in damping contact with the stationary member, when the rotatable member is subjected to a force greater than a damping force between the rotatable member and the stationary member, the rotatable member is rotatable relative to the stationary member and when the rotation speed of the reel disk exceeds the predetermined rotation speed, the clutch structure is actuable under the centrifugal force and connected to the rotatable member.

2. The pet leash preventing locking due to jerk according to claim 1, wherein a center of the stationary member is provided with a non-circular hole, and the housing is provided with a non-circular column therein corresponding to the non-circular hole, and the non-circular column is inserted into the non-circular hole.

3. The pet leash preventing locking due to jerk according to claim 1, wherein the rotatable member comprises an annular ring, one end of the annular ring is provided with an end plate integrally connected thereto, a center of the end plate has a central hole for the non-circular column to pass therethrough, another end of the annular ring is provided with an opening for entering of the stationary member, and a sealing plate is fixed at the opening.

4. The pet leash preventing locking due to jerk according to claim 1, wherein the clutch structure is an elastic clutch structure, when the centrifugal force of the reel disk relative to the clutch structure is greater than an elastic force, the clutch structure is actuated, and when the centrifugal force of the reel disk relative to the clutch structure is less than the elastic force, the clutch structure is reset.

5. The pet leash preventing locking due to jerk according to claim 4, wherein the elastic clutch structure comprises a spinning member hinged to the reel disk, an elastic member is disposed between the spinning member and the reel disk, and when the centrifugal force of the reel disk relative to the spinning member is greater than an elastic force of the elastic member, the spinning member rotates and one end thereof is connected to the rotatable member.

6. The pet leash preventing locking due to jerk according to claim 5, wherein the elastic member is a tension spring, and the tension spring has one end connected to the reel disk, and the other end connected to the spinning member, the rotatable member is provided with a stopper, and the spinning member abuts against the stopper after rotation of the spinning member.

7. The pet leash preventing locking due to jerk according to claim 4, wherein the elastic clutch structure comprises a blind hole provided on the reel disk, a pin body is provided in the blind hole, an elastic sheet is disposed between the pin body and the reel disk for retaining the pin body in the blind hole, the elastic sheet has one end connected to the reel disk, and the other end connected to the pin body, and when the centrifugal force of the reel disk relative to the pin body is greater than an elastic force of the elastic sheet, one end of the pin body extends out of the blind hole and is connected to the rotatable member.

8. The pet leash preventing locking due to jerk according to claim 7, wherein the rotatable member is provided with a stopper, and after one end of the pin body extends out of the blind hole, a protruding end of the pin body abuts against the stopper.

9. A pet leash preventing locking due to jerk, the pet leash comprising a housing provided with a handle and a reel disk disposed in the housing, the reel disk rotatably connected to the housing, a leash rope wound on the reel disk, one end of the leash rope penetrates through the housing, wherein the housing is provided with a rotary damper, and a clutch structure is provided between the reel disk and the rotary damper, and is actuable under a centrifugal force to connect the reel disk to the rotary damper when a rotation speed of the reel disk exceeds a predetermined rotation speed, wherein the clutch structure is an elastic clutch structure, when the centrifugal force of the reel disk relative to the clutch structure is greater than an elastic force, the clutch structure is actuated, and when the centrifugal force of the reel disk relative to the clutch structure is less than the elastic force, the clutch structure is reset, and the rotary damper comprises a stationary member and a rotatable member, the stationary member is fixedly connected to the housing, the rotatable member is connected to and in damping contact with the stationary member, when the rotatable member is subjected to a force greater than a damping force between the rotatable member and the stationary member, the rotatable member is rotatable relative to the stationary member and when the rotation speed of the reel disk exceeds the predetermined rotation speed, the clutch structure is actuable under the centrifugal force and connected to the rotatable member.

10. The pet leash preventing locking due to jerk according to claim 9, wherein the stationary member has a disk shape, the rotatable member has an annular shape, and the rotatable member is wrapped around a periphery of the stationary member.

11. The pet leash preventing locking due to jerk according to claim 10, wherein a center of the stationary member is provided with a non-circular hole, and the housing is provided with a non-circular column therein corresponding to the non-circular hole, and the non-circular column is inserted into the non-circular hole.

12. The pet leash preventing locking due to jerk according to claim 10, wherein the rotatable member comprises an annular ring, one end of the annular ring is provided with an end plate integrally connected thereto, a center of the end plate has a central hole for the non-circular column to pass therethrough, another end of the annular ring is provided with an opening for entering of the stationary member, and a sealing plate is fixed at the opening.

13. The pet leash preventing locking due to jerk according to claim 9, wherein the elastic clutch structure comprises a spinning member hinged to the reel disk, an elastic member is disposed between the spinning member and the reel disk, and when the centrifugal force of the reel disk relative to the spinning member is greater than an elastic force of the elastic member, the spinning member rotates and one end thereof is connected to the rotatable member.

14. The pet leash preventing locking due to jerk according to claim 13, wherein the elastic member is a tension spring, and the tension spring has one end connected to the reel disk, and the other end connected to the spinning member, the rotatable member is provided with a stopper, and the spinning member abuts against the stopper after rotation of the spinning member.

15. The pet leash preventing locking due to jerk according to claim 9, wherein the elastic clutch structure comprises a blind hole provided on the reel disk, a pin body is provided in the blind hole, an elastic sheet is disposed between the pin body and the reel disk for retaining the pin body in the blind hole, the elastic sheet has one end connected to the reel disk, and the other end connected to the pin body, and when the centrifugal force of the reel disk relative to the pin body is greater than an elastic force of the elastic sheet, one end of the pin body extends out of the blind hole and is connected to the rotatable member.

16. The pet leash preventing locking due to jerk according to claim 15, wherein the rotatable member is provided with a stopper, and after one end of the pin body extends out of the blind hole, a protruding end of the pin body abuts against the stopper.

* * * * *